United States Patent Office 2,716,052
Patented Aug. 23, 1955

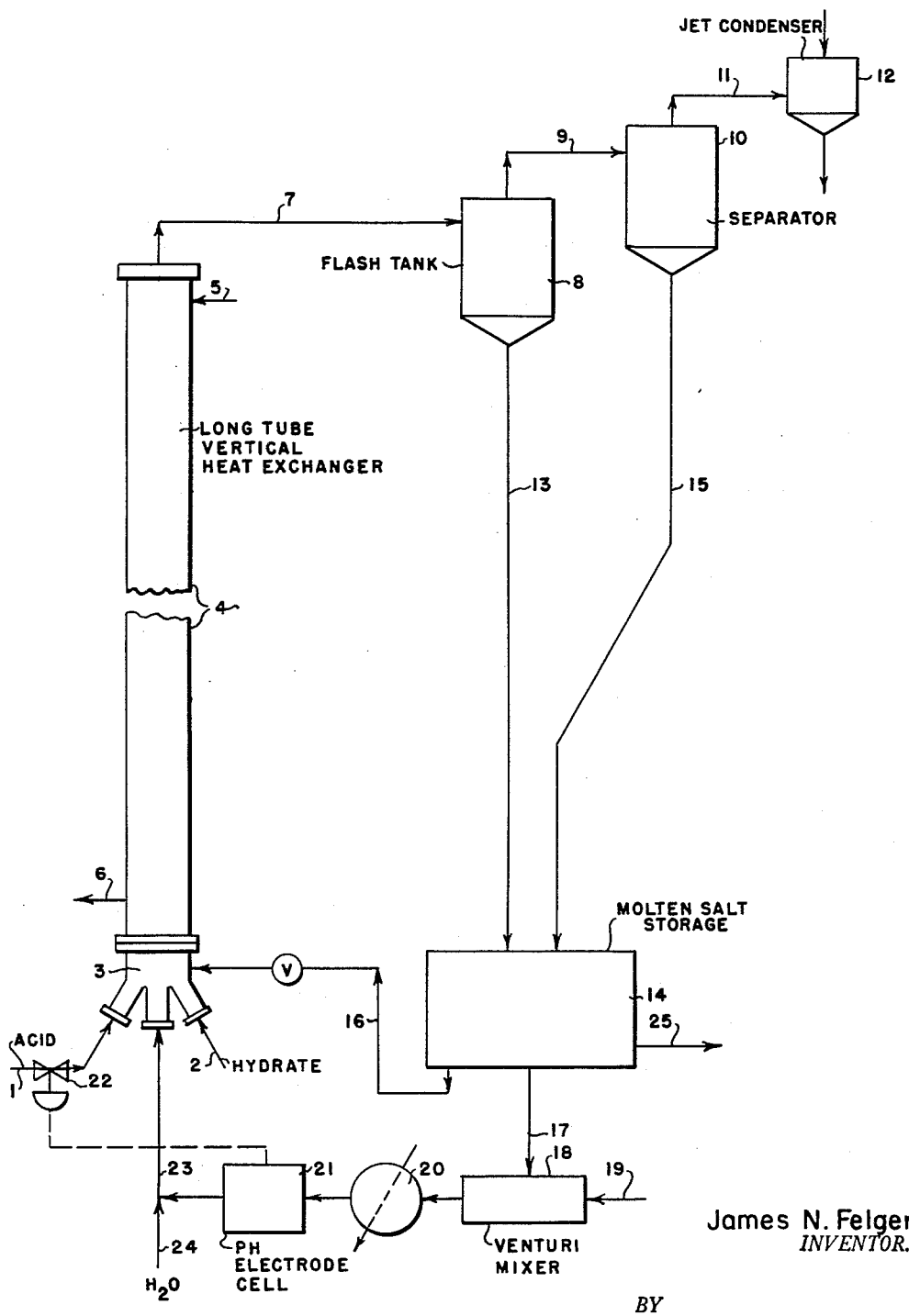

2,716,052

METHOD FOR PRODUCING ANHYDROUS HYDRAZINE SALTS

James N. Felger, Kenmore, N. Y., assignor to Olin Mathieson Chemical Corporation, a corporation of Virginia Application December 13, 1952, Serial No. 325,861

3 Claims. (Cl. 23—117)

My invention relates to a process for the manufacture of anhydrous salts of hydrazine with inorganic acids. More particularly, it relates to the conversion of aqueous solutions of hydrazine to anhydrous salts.

In the manufacture of anhydrous hydrazine from aqueous hydrazine solutions and for other purposes it is important to produce anhydrous salts of hydrazine with inorganic acids. The manufacture of anhydrous dihydrazine sulfate, $(N_2H_4)_2.H_2SO_4$, is particularly important. Except for the acid sulfate of hydrazine, $N_2H_4.H_2SO_4$, most of these salts, however, are very soluble in water and the crystallization and separation of anhydrous salts from their concentrated, syrupy solutions is difficult. As hydrazine is a sufficiently strong base that considerable quantities of heat are evolved on neutralization with inorganic acids, the neutralization has been carried out in dilute aqueous solution in order to control the evolution of heat. Obviously, in order to obtain anhydrous salts, such water must be removed. Operations designed to this end starting with dilute solutions are necessarily difficult because of the possibility of hydrolysis and decomposition of the desired salt during the dehydration. Moreover, they are expensive particularly as the degree of dilution is increased.

I have now devised a process for producing anhydrous hydrazine salts which avoids the difficulties connected with prior processes and advantageously permits the use of relatively concentrated hydrazine solutions and concentrated acids as reagents. Moreover, my process advantageously utilizes the formerly objectionable heat of neutralization to effect much of the evaporation of the water contained in the reaction mixture and to effect the conversion of aqueous hydrazine to its anhydrous salts with a very short time of heating, thus avoiding hydrolysis and decomposition of the salts during dehydration. Furthermore, the present process is particularly adaptable to continuous operation although it may be conducted batchwise.

My process is characterized by the utilization of the heat of reaction of aqueous hydrazine solutions with concentrated inorganic acids to evaporate water and at the same time remove anhydrous molten hydrazine salt by means of rising film evaporation. According to the process of my invention I introduce aqueous hydrazine solution and concentrated acid to a heat exchanging zone through which the reaction mixture flows as a rising film. The heat of reaction vaporizes the water which causes the reaction mixture to rise at a relatively high velocity as a molten film to the top of the heat exchanging zone thereby avoiding hydrolysis and decomposition of the salts during the dehydration. The vapor-liquid mixture is then separated preferably in external separators. For example, the molten reaction mixture is flashed in a flash zone to separate water vapor which is removed by a vacuum system and molten anhydrous hydrazine salt is recovered from the flash zone.

The heat exchanging zone may be a heat exchanger of any of various forms but is advantageously a vertical tube evaporator of the long tube type. It may comprise a jacketed tube or bundle of heat exchanger tubes. Advantageously a mixing chamber immediately precedes the heat exchanging zone and preferably the two reagents are introduced into the mixing chamber or base of the vertical heat exchanger at high velocity and thus impinge on each other so as to insure complete reaction and give added velocity to the rising film. Advantageously a swirl cone may be provided within the mixing chamber.

From the exit of the heat exchanger, the reaction mixture enters a vapor-liquid separating system, for example a flash zone connected, preferably through a cyclone separator, to a source of vacuum, for example, a barometric jet condenser. It is advantageous to provide a cyclone separator following the flash zone in order to remove any entrained spray of molten salt from the stream of water vapor removed from the flash zone. In the flash zone, substantially all of the vaporized moisture is removed and the anhydrous salt in molten condition is suitably removed downwardly to a storage zone. Heat exchange means also may be provided between the flash zone and molten salt storage to reduce the temperature of the molten salt to that desired in storage. Molten salt from the separator also is returned to storage. The product may be removed from the storage zone for various uses where the molten salt is desired or may be cooled and solidified, for example, in a flaker.

It is important to control the pH of the product in order to avoid formation of the relatively insoluble acid hydrazine salts, for example, hydrazine acid sulfate. The pH of the final product is controlled by controlling the proportions of the reactants fed to the heat exchanging zone. Advantageously, this is done by means for measuring the pH of the salt product and metering means in the hydrazine and/or acid feed lines. For example, a portion of the molten anhydrous salt is removed from the stream between the flash zone and molten salt storage, diluted suitably with steam and cooled to obtain an aqueous solution of suitable concentration. The solution passes through a pH measuring device, for example, an electrode cell, and the solution is then returned to the heat exchanging zone. The pH measuring device operates a motor valve in the concentrated acid and/or hydrazine feed lines to adjust the final product to the desired composition. Some dilution water may be added to the reaction zone if desired in order to provide better control of the metering of the feed streams of acid and aqueous hydrazine.

When a vertical heat exchanger is used, the control point is the temperature at the top and heat may be added or removed in the heat exchanger to adjust this temperature. The addition or removal of heat will depend on the concentration of reactants, the particular reactants used, the degree of vacuum and the limiting proportion of moisture desired in the anhydrous salt. Better control of the boiling characteristics of the mixed reactants advantageously is obtained by recycling a portion of the fused, anhydrous product to the mixing zone or to the heat exchanger inlet.

It is advantageous according to my invention to utilize hydrazine hydrate as feed since aqueous solutions of this composition are readily obtained by the distillation of more dilute solutions at atmospheric pressure. More concentrated solutions of hydrazine are more difficultly obtainable but may be used if desired. More dilute solutions than that corresponding to hydrazine hydrate may also be used in the process but the increased proportions of water to be removed place a greater burden on the system and the operation is less advantageous. It is desirable to concentrate more dilute solutions of hydrazine by atmospheric distillation to form hydrazine hydrate which is the preferred feed stock for the process of the present invention.

In the manufacture of dihydrazine sulfate, for example, concentrated sulfuric acid may be fed to the reaction zone but control of proportions is easier if somewhat more dilute acid is utilized. Concentrations of from 50 to about 90 per cent are preferred since they contain the minimum proportion of water consistent with easy control of flow rates and accurate control of the final pH of final product. Sulfuric acid is metered into the reaction zone to react with the aqueous hydrazine feed but the proportion of acid is limited to avoid the formation of hydrazine acid sulfate. This salt fuses at a very high temperature with decomposition and its preparation is not feasible according to the present process. The pH of the reaction mixture leaving the heat exchanger should be within a pH range of about 2.5 to 5.5 but preferably not less than about 4.5 in order to avoid certainly the formation of the relatively insoluble hydrazine acid sulfate.

Other acids which may be used to prepare other anhydrous salts include phosphoric acid, hydrochloric acid, hydrobromic acid and other inorganic acids as well as mixtures of these acids where mixed salts are desired.

The process of my invention will be further illustrated by the acompanying drawing which is a simplified flow diagram of a preferred continuous method of operation.

In the drawing concentrated acid, for example sulfuric acid, is introduced by line 1 and hydrazine hydrate by line 2 to a mixing chamber 3. The reactants flow upward from the mixing chamber through a long tube vertical heat exchanger 4. Heat, for example, steam, is added or removed by lines 5 to 6. Molten hydrazine salt and water vapor are removed by line 7 to a flash tank 8. The flash tank is connected by line 9 to a cyclone separator 10 which is in turn connected by line 11 to a vacuum source, e. g., a barmetric jet condenser 12. In the flash tank 8 water vapor is removed and molten salt is removed by line 13 to a storage tank 14. The molten salt line 13 may be provided with suitable cooling means to adjust the salt temperature. In the separator 10, any molten salt carry-over is separated from the water vapor stream and returned by line 15 to storage tank 14. Control of the boiling characteristics of the reactants is advantageously obtained by recycle of molten salt by valved line 16 to the mixing zone 3. The pH of the final composition is adjusted by withdrawing a sample of the molten salt by line 17 to venturi mixer 18, diluting the molten salt sample with steam introduced by line 19 to venturi mixer 18, cooling the mixture in cooler 20 and introducing the diluted cooled mixture to electrode cell 21. In the cell 21, the pH of the salt is measured and controlling means operate a motor valve 22 in acid line 1 which controls the amount of acid feed in accordance with the measured pH of the sample and the desired pH of the final composition. The solution from cell 21 is returned to mixing zone 3 by line 23. If desired, dilution water may be added by line 24 to the solution in line 23. Alternatively, the cell may operate a valve in hydrate feed line 2 or in both acid and hydrate feed lines. Anhydrous hydrazine salt product is removed from storage tank 14 by line 25.

I claim:

1. A process for producing anhydrous hydrazine salts which comprises separately introducing an aqueous solution of a hydrazine and a concentrated inorganic acid to the base of an elongated heat exchanging zone, wherein the hydrazine and acid react to produce a corresponding hydrazine salt, vaporizing water present in the resulting reaction mixture in said heat exchanging zone by the released heat of reaction of the hydrazine and acid, whereby the resulting reaction mixture is driven as a molten film through the heat exchanging zone to the opposite end thereof, separating and removing water vapor from the molten reaction mixture flowing from the opposite end of the heat exchanging zone, and recovering molten anhydrous hydrazine salt.

2. The process of claim 1 in which a portion of the recovered molten anhydrous hydrazine salt is returned to the heat exchanging zone to control the boiling characteristics of the reaction mixture in the heat exchanging zone.

3. A process for producing anhydrous dihydrazine sulfate which comprises separately introducing an aqueous solution of hydrazine and concentrated sulfuric acid to the base of an elongated heat exchanging zone, wherein the hydrazine and acid react to produce dihydrazine sulfate, vaporizing water present in the resulting reaction mixture in said heat exchanging zone by the released heat of reaction of the hydrazine and acid, whereby the resulting reaction mixture is driven as a molten film through the heat exchanging zone to the opposite end thereof, separating and removing water vapor from the molten reaction mixture flowing from the opposite end of the heat exchanging zone, and recovering molten anhydrous dihydrazine sulfate.

References Cited in the file of this patent

UNITED STATES PATENTS

| | | |
|---|---|---|
| Re. 13,117 | Kestner | May 24, 1910 |
| 441,371 | Morrell | Nov. 25, 1890 |
| 509,749 | Morrell | Nov. 28, 1893 |
| 995,776 | Dunn | June 20, 1911 |
| 1,013,091 | Kestner | Dec. 26, 1911 |

OTHER REFERENCES

"The Chemistry of Hydrazine" by Audrieth and Ogg, pp. 167–172, John Wiley and Sons, N. Y. (1951 ed.).